United States Patent [19]
Ono et al.

[11] 3,877,881
[45] Apr. 15, 1975

[54] REACTORS FOR HIGHLY VISCOUS MATERIALS

[75] Inventors: Kaoru Ono; Masashi Kamada; Hiroyuki Ohisuru; Yoshikazy Wakabayashi, all of Hiroshima; Shotaro Nakamura; Tadashi Yamada, both of Tokuyama, all of Japan

[73] Assignees: Mitsubishi Jukogyo Kabushiki Kaisha; Idemitsu Petrochemical Co., Ltd., both of Tokyo, Japan

[22] Filed: Dec. 20, 1972

[21] Appl. No.: 316,765

Related U.S. Application Data

[63] Continuation of Ser. No. 862,230, Sept. 30, 1969, abandoned.

[30] Foreign Application Priority Data
Oct. 8, 1968   Japan ............................. 43-73420

[52] U.S. Cl. .................... 23/285; 259/107; 165/109
[51] Int. Cl. ............................ B01j 3/00; B01f 7/16
[58] Field of Search ............ 23/283, 285; 259/8, 23, 259/24, 95, 97, 107, 108; 260/95 R, 96 R, 94.9 P; 165/94, 95, 108, 109

[56] References Cited
UNITED STATES PATENTS

| | | |
|---|---|---|
| 3,049,413 | 8/1962 | Sifford .................................. 23/285 |
| 3,438,952 | 4/1969 | Christensen ...................... 260/83.7 |
| 3,476,522 | 11/1969 | Stovall ................................. 23/285 |
| 3,508,882 | 4/1970 | Farnell ................................. 23/285 |
| 3,513,145 | 5/1970 | Crawford ........................... 260/935 |

Primary Examiner—James H. Tayman, Jr.
Assistant Examiner—Timothy W. Hagan
Attorney, Agent, or Firm—Otto John Munz

[57] ABSTRACT

A reactor for continuous polymerization of materials to high viscosity employs a heat exchange jacketed cylindrical vessel, a concentrically mounted draught tube, four radially-extending arms rotatably mounted in the upper part of the vessel, two inner downwardly extending strips attached to two of the arms, a first helical screw fixedly attached to the inner strips, four outer downwardly extending strips, wherein the upper ends are attached to the ends of the arms and their lower ends are connected by a ring member, and a second and a third helical screw, each having its outside edge just inside the interior wall of the vessel and the inside edge just outside the outer wall of the draught tube. The second and third helical screws are fixedly attached to the four strips at each intersection of its respective helical screw with a strip.

The convolutions of the third helical screw lie within the convolutions of the second helical screw.

1 Claim, 2 Drawing Figures

RAW MATERIAL SUPPLY MEANS

REACTORS FOR HIGHLY VISCOUS MATERIALS

CROSS-REFERENCE TO RELATED APPLICATION

This application is a continuation of the parent U.S. application Ser. No. 862,230 filed Sept. 30, 1969, now abandoned.

FIELD OF THE INVENTION

This invention relates to an improvement in the design of large reactors used for continuous polymerization of materials so as to obtain a polymer of a high viscosity especially to reactors which require good agitation and heating during polymerization.

DESCRIPTION OF THE PRIOR ART

In the prior art the conventional reactors for this purpose are a screw agitating type reactor with an internal draught tube, a ribbon or screw agitating type reactor without the draught tube and a ribbon or screw agitating and surface scraping type reactor with the draught tube.

However, the former two types of reactors are not adequately suitable for materials whose viscosity will rapidly increase with the advance of the polymerization, because they offer only limited heating surfaces and have a low agitating ability.

The ribbon or screw agitating and surface scraping type reactor with the draught tube, while it has a good heating efficiency for treatment of viscous materials, has its own deficiencies because its height can not be increased to obtain a larger heating surface for a limited volume of the reactor and a good blending of the material, and because the vanes rotating in its annular space oscillate thus adversely affecting agitation, blending of the material, and causing harmful coloring of the products, an increase in power consumption for running the reactor and its deterioration. An increase in the length of the ribbon screw agitator of the prior art increases the undesirable oscillation, thus nulifying any advantages, which otherwise may be gained thereby. If the apparatus becomes large in size, it must be made long and a large helical agitator must be accomodated in the inner space of the reactor. If in such a large apparatus the upper arm supporting the agitator above is slightly tilted, the lateral vibrations become gradually wider in the lower region even when the tilt of the upper arm is small. As result, the outer periphery of the helical agitator is pushed against the inner wall of heat exchange tube, big resistance to the rotation occurs unfavorably affecting the polymerization treatment.

The mixing-agitating effects are decreased because of the eccentricity of helical screw itself.

Local overheating arises by the friction between the helical screws and the inner wall.

The inventors discovered that the occurence of the lateral vibration depends on the abnormal stress of twist or torsion, and the like whereby the supporting arms of the helical screws are lifted upwardly by the irregular fluid resistance of the helical screws located in the outer circular space.

SUMMARY OF THE INVENTION

The objects of the invention are:
to eliminate the disadvantages of the reactors of the prior art and permit the construction of more efficient and larger reactors for the purpose stated;
to provide a reactor of this type having an improved design incorporating:
a cylindrical vessel;
a heat exchange jacket surrounding the vessel;
an cylindrical draught tube mounted concentrically within the vessel;
an upper shaft rotatably mounted on an axis concentric to the axis of the vessel and the draught tube;
four arms fixedly mounted on the lower end of the upper shaft and extending radially therefrom;
two inner downwardly extending strips with their upper ends attached to two of the arms, the thickness of the strips being less than the width of the strips, the strips leading with their smaller side in the direction of rotation, the outer surface of the strips being positioned just inside the inside wall of the draught tube;
a transverse member fixedly attached to the bottom of each inner downwardly extending strip;
a lower shaft fixedly attached to the transverse member and rotatably mounted on the same axis as the upper shaft;
a first helical screw having the outside diameter slightly smaller than the inside diameter of the draught tube, being internally fixed attached to the inner downwardly extending strips;
four outer downwardly extending strips, the upper ends of which being attached to the ends of the arms by their width thus leading with their smaller side in the direction of rotation, the thickness of the strips being less than the width of the strips, the lower ends of the four strips being connected by a ring member, the outer surface of the strips being positioned just inside the interior wall of the vessel;
a second helical screw, the outside edge of which being just inside the interior wall of the vessel and its inside edge being just outside the outer wall of the draught tube, the second helical screw being integrally fixed attached to all four strips at each intersection of the second helical screw with a strip; and
a third helical screw, the outside edge of which being just inside the interior wall of the vessel and its inside edge just outside the outer wall of the draught tube, the third helical screw being integrally fixedly attached to all four strips at each intersection of the third helical screw with a strip, the convolutions of the third helical screw lying within the convolutions of the second helical screw.

DETAILS OF THE INVENTION

Figure 1:
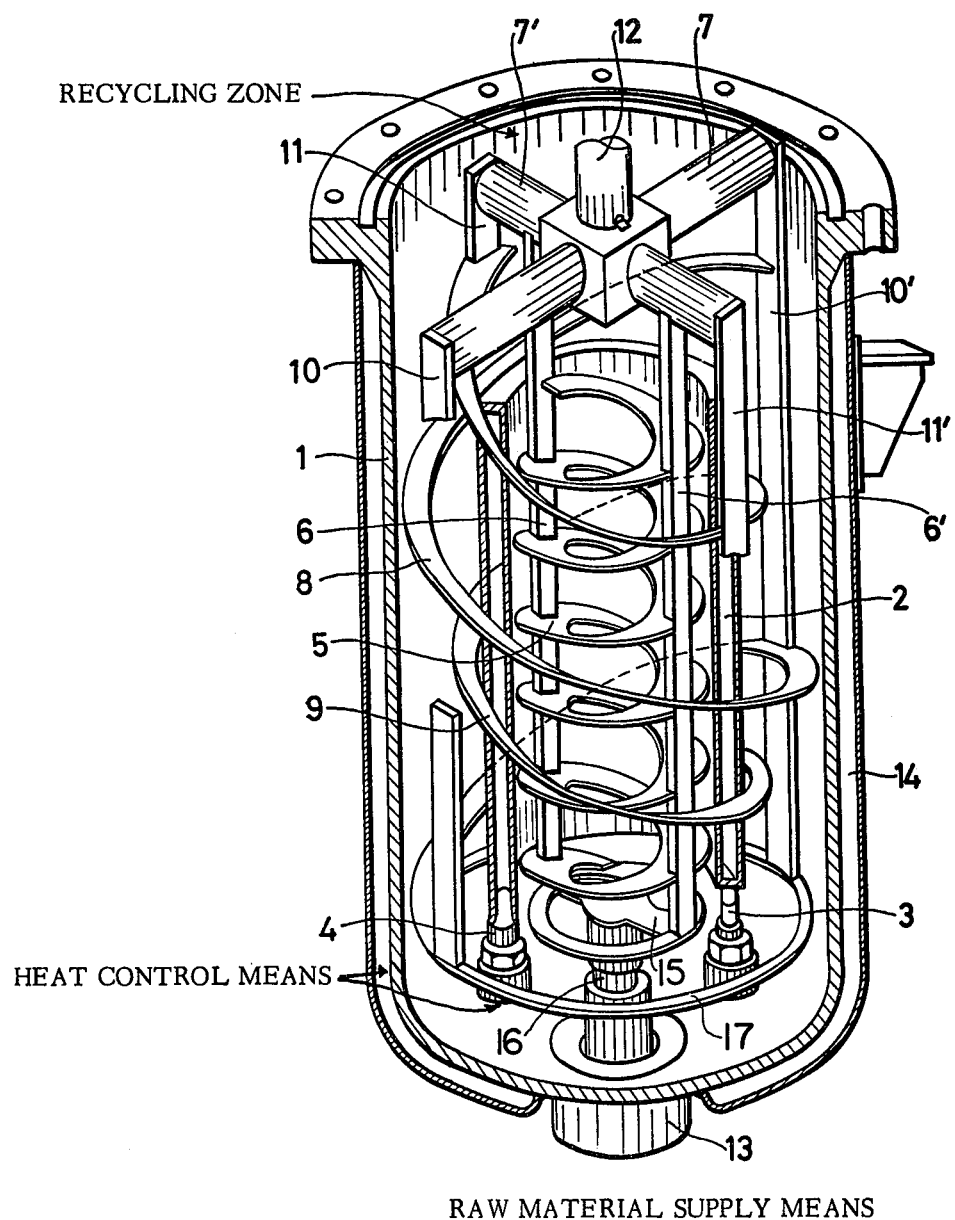
FIG. 1 is partially cutaway perspective views showing the internal structures of the preferred embodiments of the invention and FIG. 2 is a cross-sectional view of a detail of the invention.

The invention will be described in greater detail with reference to the accompanying drawings illustrating the preferred embodiments.

In the drawings, the draught tube 2 is shown as a hollow cylinder, installed concentrically in the vessel 1. A heating exchange medium such as steam, water or Dowtherm is circulated therethrough an inlet 3 and an outlet 4. A first helical screw is installed in the interior of the draught tube, fixed by supporting bars 6, 6' so that a little clearance is provided between its outer edge and the interior wall of the draught tube. The upper ends of the bars 6, 6' are fixedly attached to the upper arms 7, 7' and the lower ends thereof are fixedly attached to a transverse member 15. A lower shaft 16 is fixedly attached to the transverse member 15 and is rotatably mounted on the same axis as the upper shaft 12. A second helical screw 8 and a third helical screw 9 are rigid and are mounted in the annular space between the outside wall of the draught tube 2 and the inside wall of the vessel 1. The screws 8 and 9 are coiled in opposite direction to the ribbon screw 5 in the interior space of the draught tube. The screw 8 has its outer edge supported by vertical bars 10 and 10' fixed at both ends of the upper arm 7, a small clearance is provided between the outer edge of the screw 8 and the interior wall of the vessel 1. The screw 9 has its outer edge supported by vertical bars 11 and 11' fixed at each end of the upper arm 7'. A small clearance is provided between the inner edge of the screw 9 and the outside wall of the draught tube 2. The driving shaft 12 is fixed at the intersection of the arms 7, 7' and extends to a motor through the vent of the top cover of the vessel 1. By rotating the shaft the cross arms 7, 7', the supporting bars 6, 6', 10, 10', 11 and 11' and the screws 5, 8 and 9, which are connected fixedly to the shaft 12, rotate synchronously. The reactor has an inlet 13 for feeding materials, two outlets through the top cover of the vessel (not shown) and heating jacket 14 surrounding the whole exterior wall of the vessel 1.

The minimum volume required for continuous operation is about 5 liter.

The lowest viscosity is about 100 centipoise.

In the reactor of the present invention the materials to be treated are fed from the bottom inlet 13 and move upward in the interior space of the draught tube 2 by the forwarding action of the ribbon screw. While in the interior of the tube the materials are simultaneously mixed and the polymerizing reaction advanced. Subsequently the materials are guided from the top outlet of the interior space downwardly through the annular space between the vessel and the draught tube by the ribbon screws 8 and 9 transfer and mix them.

The ribbon screws 8 and 9 are coiled in the direction opposite to that of the screw 5. The materials after having arrived at the bottom of the vessel are mixed with fresh materials which are introduced into the vessel 1 through the inlet 13, and circulate again through the interior cylindrical space of the draught tube 2 as described above. After repeated circulations a portion of the materials which has reached a desirable degree of polymerization, is removed through the top outlets.

During polymerization the temperature of the reaction system inevitably changes due to the heat generated by the reaction and for this reason heat exchange controls are incorporated as means for good polymerization.

The reactor of the present invention minimizes the lowering of the heat transfer efficiency normally caused by the adhesion of the materials to the heating surfaces, because with its two concentric cylindrical jackets, i.e., the draught tube 2, and the outer jacket 14, provides larger heating surfaces. The plural screws by the scraping action of their edges also aid the heat exchange by continuously cleaning the heating surface.

The occurence of lateral vibration of strips in accordance with this invention is decreased further because the lower ends of the four strips employed are connected by a ring member 17.

Figure 2:
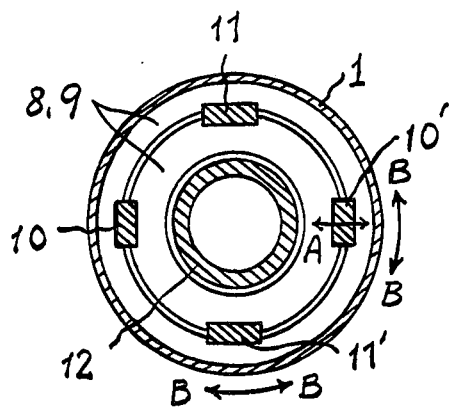

As demonstrated in FIG. 2, the vibration of screws is extremely decreased. Strips 10, 10', 11 and 11' have a smaller rigidity in the direction of arrow A and a larger rigidity in the direction of arrow B. The four strips are connected to each other by means of screws 8, 9, so that if the external force of the arrow A is added to one of the strips it is supported by the force of a large rigidity in the direction of arrow B of the adjacent strips.

Thus the strip has the advantage of the resistance against the external force and the deformation of each strip can be avoided. The present invention empolys strips of rectangular shape. In order to increase the rigidity of the screws or agitators in their rotational direction four such strips are shown in FIG. 2. Each strip is connected by means of the helical screws.

The smaller side of the strips corresponds to the arrows B of FIG. 2 in the direction of rotation.

The following Examples of the effectivity of this invention are the results of comparative tests:

Example 1:
1. Size of the cylindrical vessel: Diameter: 1,200 mm, Length: 2,400 mm
2. Gap between the inner wall of vessel and the helical screws: 3 – 5 mm
3. Number of strips: 4

Example 2
1. Size of the cylindrical vessel: Diameter: 1,500 mm, Length: 3,000 mm
2. Gap between the inner wall of vessel and the helical screws: 3 – 5 mm
3. Number of strips: 4

In both tests rotation of the screws was efficient and the product satisfactory.

A reactor of the prior art with two strips for treating the high viscous material was tested under comparative conditions, but there was no rotation of screws because of the contact of the helical screws with the wall of vessel.

What is claimed is:
1. A reactor comprising:
   A. a heat exchange jacketed cylindrical vessel;
   B. a cylindrical draught tube mounted concentrically within the vessel;
   C. an upper shaft rotatably mounted on an axis concentric to the axis of the vessel and the draught tube;
   D. four arms fixedly mounted on the lower end of the upper shaft and extending radially therefrom;
   E. two inner downwardly extending strips with their upper ends attached to two of said arms, the thickness of the strips being less than the width of the strips, the strips leading with their smaller side in the direction of rotation, the outer surface of said strips being positioned just inside the inside wall of the draught tube;
   F. a transverse member fixedly attached to the bottom of each inner downwardly extending strip;
   G. a lower shaft fixedly attached to the transverse member and rotatably mounted on the same axis as the upper shaft;
   H. a first helical screw having the outside diameter slightly smaller than the inside diameter of the draught tube, being internally fixedly attached to the inner downwardly extending strips;

I. four outer downwardly extending strips, the upper ends of which being attached to the ends of said arms by their width leading with their smaller side in the direction of rotation the thickness of the strips being less than the width of the strips, the lower ends of said four strips being positioned just inside the interor wall of the vessel;

J. a second helical screw, the outside edge of which being just inside the interior wall of the vessel and its inside edge being just outside the outer wall of the draught tube, said second helical screwing being integrally fixed attached to all four strips at each intersection of said second helical screw with a strip; and K. a third helical screw, the outside edges of which being just inside the interior wall of the vessel and its inside edge just outside the outer wall of the draught tube, said third helical screw being integrally fixed attached to all four strips at each intersection of said third helical screw with a strip, the convolutions of said third helical screw lying within the convolutions of said second helical screw.

* * * * *

UNITED STATES PATENT OFFICE
CERTIFICATE OF CORRECTION

Patent No. 3,877,881                              Dated April 15, 1975

Inventor(s) Kaoru Ono et al

It is certified that error appears in the above-identified patent and that said Letters Patent are hereby corrected as shown below:

At paragraph [75] on the front page format, correct the co-inventors' names to read: Hiroyuki Ohtsuru and Yoshikazu Wakabayashi.

Signed and sealed this 10th day of June 1975.

(SEAL)
Attest:

RUTH C. MASON
Attesting Officer

C. MARSHALL DANN
Commissioner of Patents
and Trademarks